Patented May 6, 1952

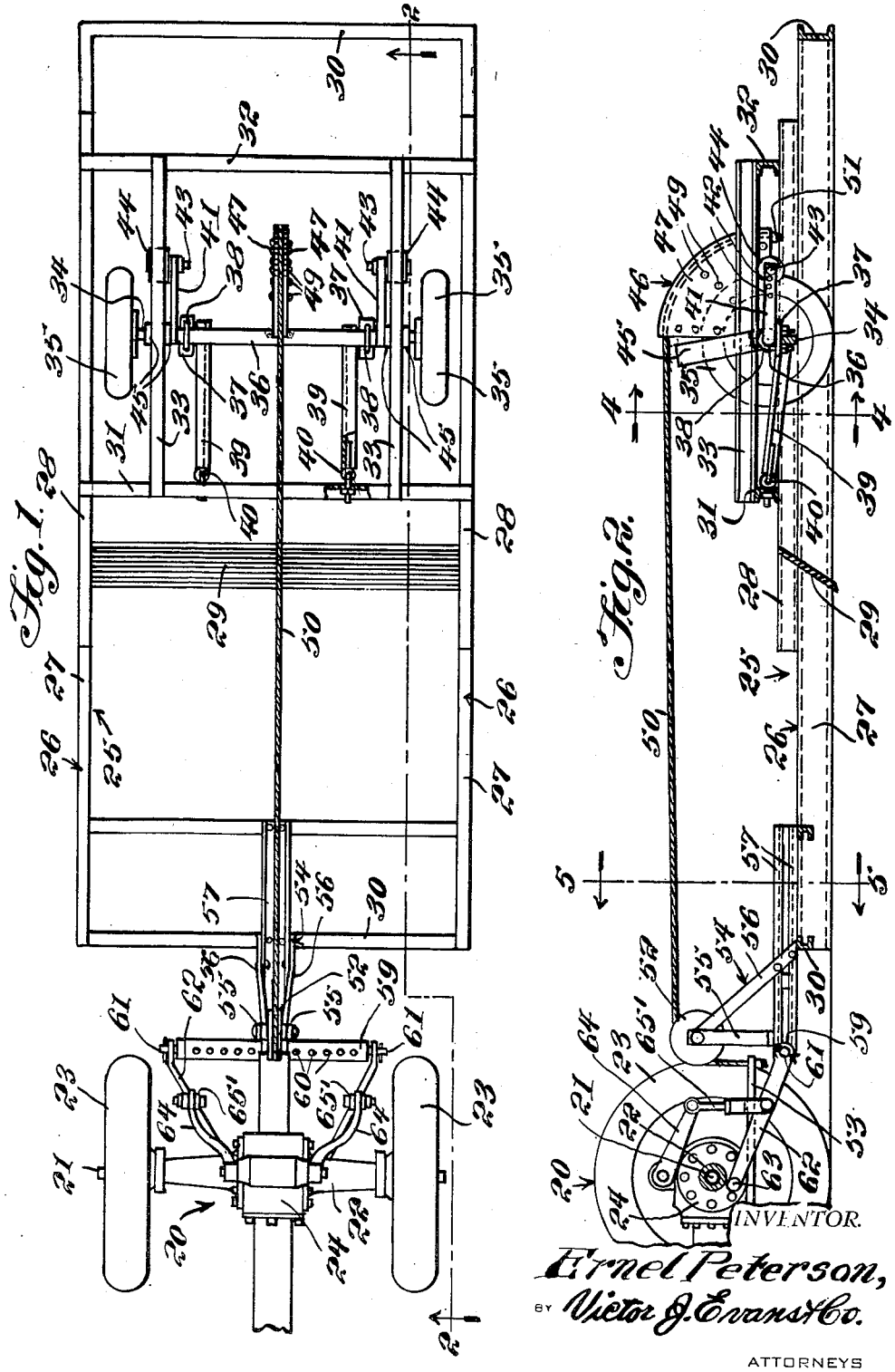

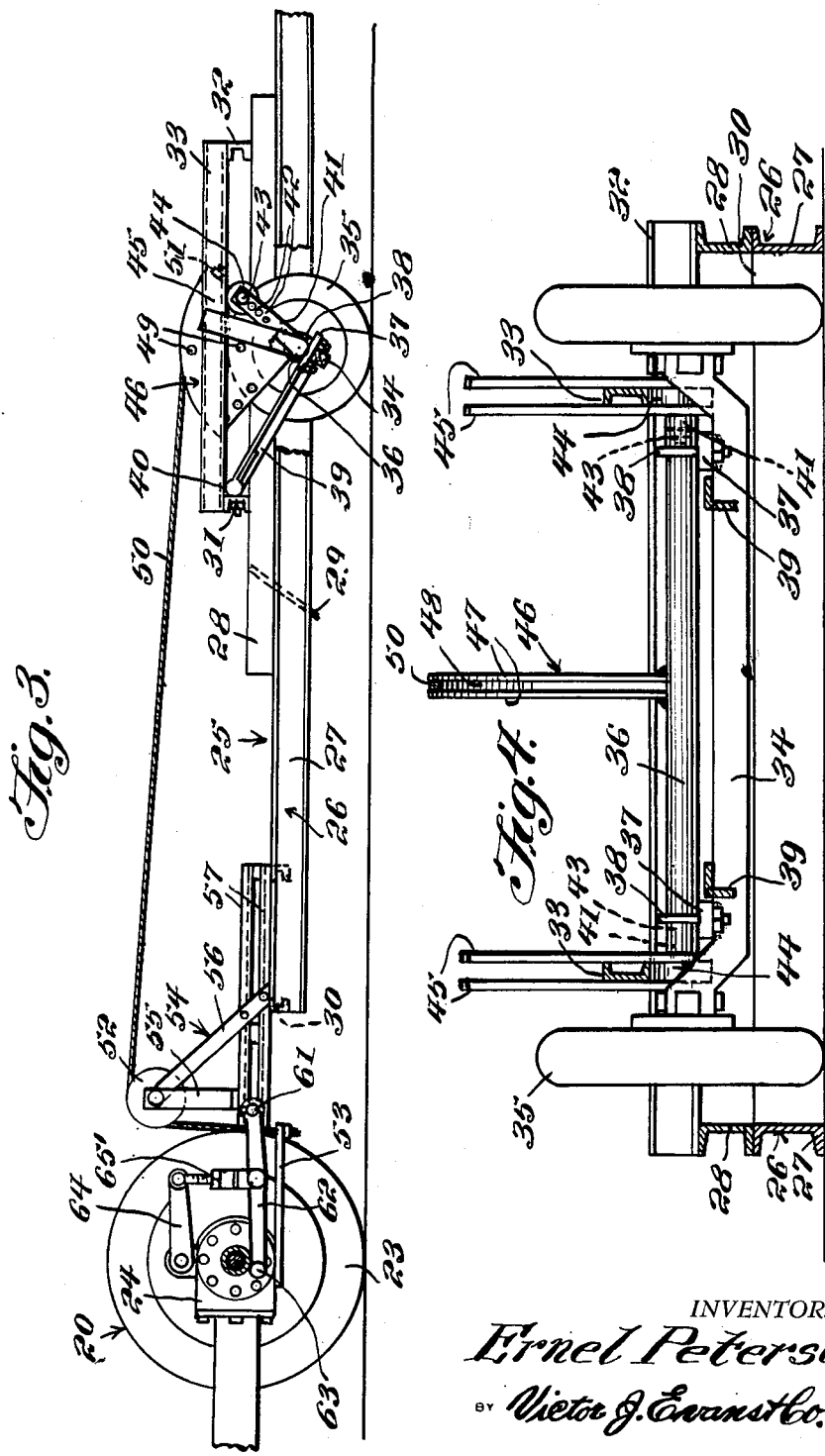

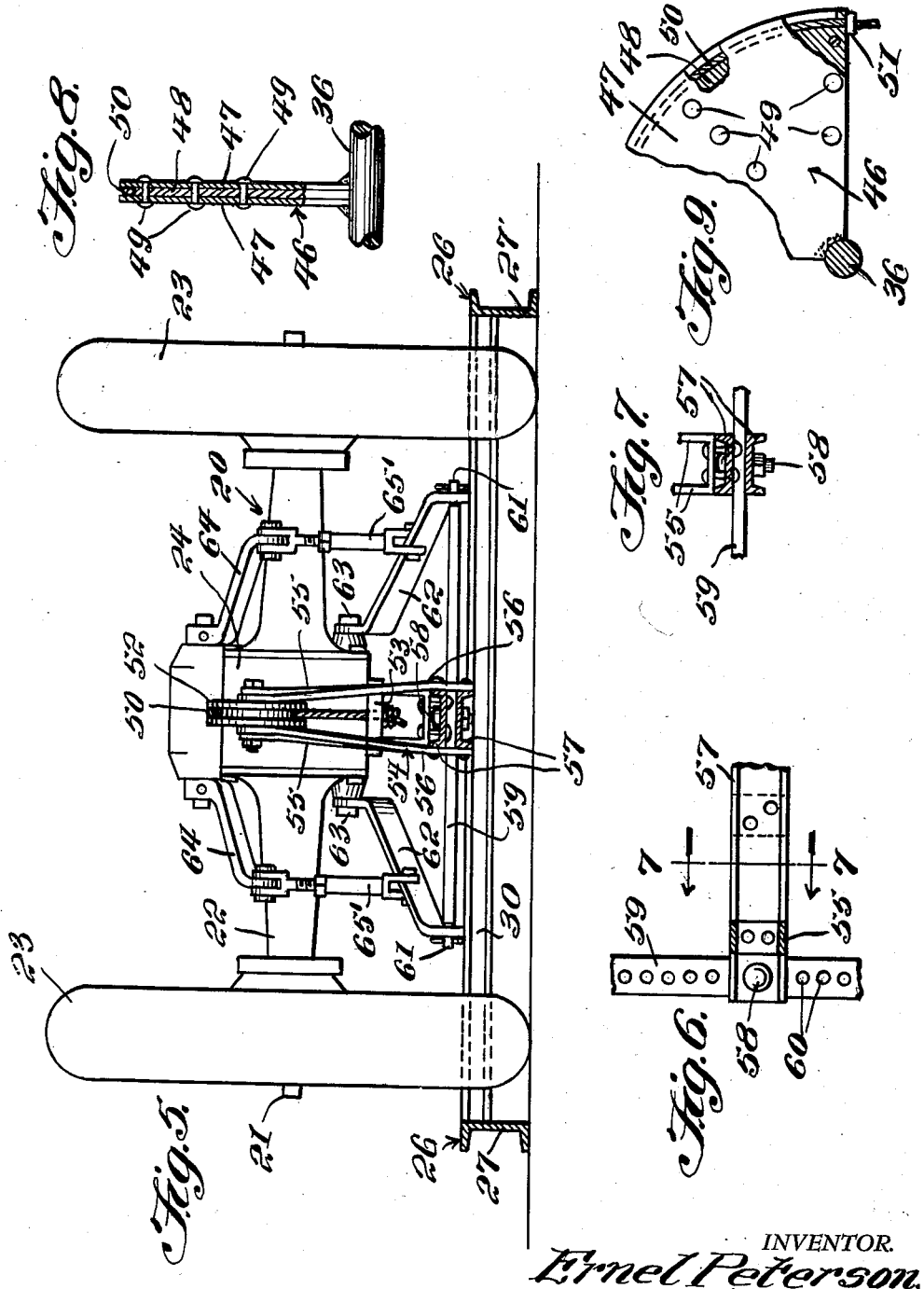

2,595,289

UNITED STATES PATENT OFFICE 2,595,289

LEVEL MAINTAINING IMPLEMENT FRAME LIFT

Ernel Peterson, Salina, Utah

Application November 18, 1949, Serial No. 128,090

2 Claims. (Cl. 37—180)

This invention relates to agricultural equipment, and more particularly to a control means for an implement, such as a ground leveler, dump bucket or the like.

The object of the invention is to provide a control mechanism for an implement, such as a ground leveler or dump bucket which is adapted to be towed by a tractor, the control mechanism providing a means whereby the implement can be raised, lowered or adjusted as desired.

Another object of the invention is to provide a control mechanism for an implement which is releasably mounted behind a tractor, the control mechanism enabling the tractor operator to readily move the implement into and out of engagement with the ground.

Still another object of the invention is to provide a control mechanism for an implement whereby the implement can be adjusted so as to vary the depth of cutting as desired, the implement adapted to be pivotally mounted behind a tractor.

A further object of the invention is to provide an implement lift which is extremely simple and inexpensive to manufacture.

Other objects and advantages will be apparent during the course of the following description.

In the accompanying drawings forming a part of this application, and in which like numerals are used to designate like parts throughout the same:

Figure 1 is a top plan view of a ground leveler or scraper attached to the rear of a tractor, and with the control mechanism of the present invention attached thereto;

Figure 2 is a sectional view taken on the line 2—2 of Figure 1 and with the implement in lowered or ground-engaging position;

Figure 3 is a side elevational view showing the implement in raised position, and with parts broken away and in section;

Figure 4 is a sectional view taken on the line 4—4 of Figure 2;

Figure 5 is an enlarged sectional view taken on the line 5—5 of Figure 2;

Figure 6 is a fragmentary top plan view, with parts in section, and showing the pivotal connection of the implement to the drawbar;

Figure 7 is a sectional view taken on the line 7—7 of Figure 6;

Figure 8 is an end elevational view of the sheave, with parts broken away and in section;

Figure 9 is a fragmentary side elevational view of the sheave, with parts broken away and in section;

Referring in detail to Figures 1 through 9 of the drawings, the numeral 20 designates a portion of a conventional tractor, and the tractor includes a rear axle 21 which is rotatably arranged in a casing 22. The axle 21 has the usual wheels 23 mounted thereon. Arranged intermediate the ends of the axle casing 22 is a power take-off housing 24 which is conventional and is actuated either mechanically or hydraulically.

Arranged in trailing-behind relation with respect to the tractor 20 is an implement 25. The implement 25 is a ground scraper or leveler and includes a frame that has a structure to be subsequently described. The frame of the implement 25 includes a pair of spaced parallel side members 26. Each of the side members 26 comprises an elongated beam 27 which has a stringer 28 secured to the top thereof. An inclined blade 29 extends between the side members 26 and is secured thereto, and the blade 29 moves into and out of engagement with the ground as the implement is raised and lowered, as later described in this application.

The frame of the implement 25 further includes a pair of spaced parallel braces 30 which extend between the ends of the side members 26 and are secured thereto, as by welding. Arranged intermediate the pair of braces 30 is a pair of spaced parallel support members 31 and 32. The support members 31 and 32 extend between the side members 26, and the support members 31 and 32 are secured to the upper surface of the stringers 28. A pair of spaced parallel bars 33 extend between the support members 31 and 32 and are secured thereto for a purpose to be later described.

Arranged intermediate the support members 31 and 32 is a horizontally-disposed axle 34, Figures 1 through 4. A pair of ground-engaging wheels 35 are mounted on the ends of the axle 34. Rotatably supported by the axle 34 is a horizontally-disposed shaft 36. For rotatably supporting the shaft 36 on the axle 34, a pair of plates 37 are secured to the axle 34, as by welding. Suitable U-bolt assemblies 38 rotatably embrace the ends of the shaft 36 and the U-bolt assemblies 38 are connected to the plates 37. For preventing accidental shifting of the axle 34, a pair of spaced parallel rods or angle irons 39 each have one end secured, as by welding, to the axle 34. The other end of each of the rods 39 is pivotally connected to the support member 31 by an I-bolt assembly 40. The intermediate portion of the axle 34 is offset with respect to the ends thereof, as best seen in Figure 4. Thus, the ends of the axle 34 engage the center of the wheels 35.

A pair of spaced parallel arms 41 each has an end secured, as by welding, to the shaft 36. The other end of each of the arms 41 is provided with a plurality of spaced openings or apertures 42, and a pin 43 projects through one of the openings 42 and supports a roller 44 thereon. The roller 44 is disposed below and in contact with each of the bars 33, so that as the shaft 36 is rotated, the rollers 44 will lift the bars 33 to thereby raise the frame and move the blade 29 out of engagement with the ground. The plurality of openings 42 are for the purpose of permitting the pin 43 to be adjusted in position in the arm 41, whereby the length of the stroke can be varied as desired.

For guiding the frame of the implement 25 during its raising and lowering movements, a plurality of standards 45 are provided, the standards 45 each having its lower end secured to the axle 34. The standards 45 are arranged in pairs, and each pair of standards 45 embraces one of the bars 33, Figure 4, so that shifting or swaying of the frame will be prevented as the frame is raised and lowered.

Arranged intermediate the ends of the shaft 36, and secured thereto, as by welding, is a quadrant or sector-shaped sheave 46, Figures 8 and 9. The sheave 46 includes a plate 48 which is interposed between a pair of spaced side members 47, there being a plurality of rivets 49 for maintaining the side members and plates in assembled relation. The outer edges of the side members 47 extend beyond the outer edge of the plate 48, whereby a groove or channel is provided, and a portion of an actuating cable 50 is seated in this channel. The cable 50 is preferably fabricated of wire, and one end of the cable 50 is secured to the sheave 46 by welding, as at 51, Figure 9.

The cable 50 is trained over a pulley 52, and the front end of the cable 50 is secured to an end of a horizontally-disposed bracket 53, the bracket 53 being secured to the bottom of the power take-off housing 24 in any suitable manner. The pulley 52 is rotatably supported by a tripod 54, the tripod 54 including a vertical portion 55, and an inclined portion 56. The tripod 54 is secured to a tongue 57, the tongue 57 projecting from the front end of the implement 25 and being secured thereto. A pin 58, Figure 6, projects through the front end of the tongue 57 and through one of the openings 60 in a drawbar 59, the pin 58 providing a pivotal connection between the drawbar 59 and the implement 25.

Projecting from each end of the drawbar 59 is a pin 61, and a link 62 has one of its ends pivotally connected to each of the pins 61. A pin 63 pivotally connects the rear end of each of the links 62 to the power take-off housing 24. Pivotally connected to the upper end of the power take-off housing is a pair of links or levers 64 and a member 65' pivotally connects each of the levers 64 to each of the links 62 arranged therebelow. Thus, the levers 64 are adapted to be pivoted by the usual tractor power take-off, and as the levers 64 are pivoted, the links 62 will also be pivoted, so that the implement 25 can be raised.

In use, when the implement of Figures 1 through 9 is to be used for scraping or leveling ground, the parts are in the position shown in Figure 2. Then, to raise the blade 29 so that it is not in engagement with the ground, the levers 64 are pivoted in a counterclockwise direction by means of the usual tractor hydraulic system. This results in the links 62 being pivoted in a counterclockwise direction, whereby the drawbar 59 will be raised. As the drawbar 59 is raised, the length of the vertical portion of the cable 50 will be increased, since one end of the cable 50 is connected to the bracket 53, while the other end of the cable 50 is connected to the sheave 46. This will result in the sheave 46 being rotated in a counterclockwise direction. This rotation of the sheave 46 will cause the shaft 36 to be rotated, since the sheave is secured, as by welding, to the shaft 36, and this rotation of the shaft 36 results in the arms 41 being rotated or pivoted in a counterclockwise direction. The arms 41 carry the rollers 44 which are arranged in engagement with the lower surface of the bars 33, so that the bars 33 will be raised. This upward movement of the bars 33 results in the entire implement frame being raised, since the bars 33 are secured to and are part of the implement 25. Thus, the implement will assume the position shown in Figure 3, so that the blade 29 is out of engagement with the ground.

From the foregoing, it is apparent that a control mechanism has been provided wherein dump buckets, ground scrapers or levelers, and the like can be readily raised and lowered. The control mechanism can be used for raising and lowering machinery or farm implements when the implements are to be transported, or when the depth of cutting is to be varied.

What is claimed is:

1. In combination, a tractor including a rear axle, a power take-off housing arranged adjacent said rear axle, of a ground-leveling implement arranged in trailing-behind relationship with respect to said tractor, said implement including a frame, said frame comprising a pair of spaced parallel side members, a plurality of spaced parallel braces extending between the ends of said side members and secured thereto, a blade extending between said side members and secured thereto, a pair of spaced parallel, horizontally-disposed support members arranged intermediate said braces and secured to said side members, a pair of spaced parallel bars extending between said support members and secured thereto, an axle arranged intermediate said pair of support members, a pair of ground-engaging wheels mounted on said axle, a shaft rotatably supported by said axle, a pair of arms having one end secured to said shaft, a roller mounted on the other end of each of said arms and disposed below said bars, a pair of rods each having one end pivotally connected to one of said support members and their other ends secured to said axle, a pair of standards arranged on opposite sides of each of said bars and secured to said axle for guiding said frame during the movement thereof, a quadrant sheave secured to said shaft, a tongue secured to the front of said frame, a tripod projecting upwardly from said tongue and secured thereto, a pulley supported by said tripod, a bracket secured to the power take-off housing of said tractor, a cable trained over said pulley, said cable having one end connected to said bracket and its other end connected to said sheave, a drawbar pivotally connected to said tongue, and means operatively connecting said power take-off housing to said drawbar.

2. In combination, a frame, said frame comprising a pair of spaced parallel side members, a plurality of spaced parallel braces extending between the ends of said side members and secured thereto, a blade extending between said side members and secured thereto, a pair of spaced parallel horizontally disposed support members arranged intermediate said braces and secured to said side members, a pair of spaced parallel bars extending between said support members and secured thereto, an axle arranged intermediate said pair of support members, a pair of ground-engaging wheels mounted on said axle, a shaft rotatably supported by said axle, a pair of arms having one end secured to said shaft, a roller mounted on the other end of each of said arms and disposed below said bars, a pair of rods each having one end pivotally connected to one of said support members and their other end secured to said axle, a pair of standards arranged on opposite sides of each of said bars and secured to said axle for guiding said frame during the movement thereof, a quadrant sheave secured to said shaft, a tongue secured to the front of said frame, a tripod projecting upwardly from said tongue and secured thereto, a pulley supported by said tripod, a bracket adapted to be secured to the power take-off housing of a tractor, a cable trained over said pulley, said cable having one end connected to said bracket and its other end connected to said sheave, a drawbar pivotally connected to said tongue, and means operatively connecting said drawbar to the power take-off of a tractor.

ERNEL PETERSON.

REFERENCES CITED

The following references are of record in the file of this patent:

UNITED STATES PATENTS

| Number | Name | Date |
|---|---|---|
| 1,889,722 | Wright | Nov. 29, 1932 |
| 2,209,312 | Rapp | July 30, 1940 |
| 2,351,830 | Mitchell et al. | June 20, 1944 |
| 2,386,192 | Brimhall | Oct. 9, 1945 |